(12) United States Patent
Long et al.

(10) Patent No.: US 9,441,607 B2
(45) Date of Patent: Sep. 13, 2016

(54) MARINE CURRENT POWER GENERATION DEVICE

(71) Applicant: KABUSHIKI KAISHA TOSHIBA, Minato-ku (JP)

(72) Inventors: Than Trong Long, Yokohama (JP); Tatsuo Yamashita, Koganei (JP); Yasuo Kabata, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 547 days.

(21) Appl. No.: 14/059,905

(22) Filed: Oct. 22, 2013

(65) Prior Publication Data

US 2015/0110605 A1   Apr. 23, 2015

(51) Int. Cl.
*F03B 11/06* (2006.01)
*F03B 17/06* (2006.01)

(52) U.S. Cl.
CPC .......... *F03B 17/061* (2013.01); *F03B 11/06* (2013.01); *F05B 2280/105* (2013.01); *F05B 2280/1072* (2013.01); *F05B 2280/10304* (2013.01); *F05B 2280/6013* (2013.01); *Y02E 10/28* (2013.01)

(58) Field of Classification Search
CPC ...... F03B 11/06; F03B 11/063; F03B 17/061
USPC ........................................................ 416/174
See application file for complete search history.

(56) References Cited

U.S. PATENT DOCUMENTS 5,100,290 A * 3/1992 Berger ................. F03B 11/00
                                                    415/107

8,641,286 B2    2/2014 Long et al.
2007/0007772 A1  1/2007 Brashears et al.

FOREIGN PATENT DOCUMENTS

| DE | 42 00 385 A1 | 7/1993 |
|---|---|---|
| EP | 1 741 926 A2 | 1/2007 |
| JP | 63-301259 A | 12/1988 |
| JP | 3-43675 A | 2/1991 |
| JP | 7-217571 A | 8/1995 |
| JP | 2000-55054 A | 2/2000 |

(Continued)

OTHER PUBLICATIONS

Office Action issued Dec. 15, 2015 in Japanese Patent Application No. 2012-206648 (with English translation).
Than Trong Long, et al., "Water-Lubricated Plastic Bearing for Hydroelectric Power Systems", Toshiba Review, vol. 67, No. 4, Apr. 2012, pp. 48-51(with English abstract).

(Continued)

*Primary Examiner* — Richard Edgar
(74) *Attorney, Agent, or Firm* — Oblon, McClelland, Maier & Neustadt, L.L.P.

(57) ABSTRACT

In one embodiment, a marine current power generation device has rotary blades, rotating shaft, power generator, guide bearings, thrust collars and thrust bearings. The guide bearing has a second slide surface being slidable relative to the first slide surface of the rotating shaft. The thrust bearing has a fourth slide surface being slidable relative to the third slide surface of the rotary plate of the thrust collar. The materials of the first and third slide surfaces include ferrous materials, stainless materials, Ti, Ti alloy, Co, or Co alloy. The materials of the second and fourth slide surfaces include a resin material filled with a first fibrous member and a second fibrous member. The second fibrous member is smaller than the first fibrous member.

10 Claims, 3 Drawing Sheets

(56) References Cited

FOREIGN PATENT DOCUMENTS

| | | |
|---|---|---|
| JP | 2001-123061 A | 5/2001 |
| JP | 2007-16786 | 1/2007 |
| JP | 2007-170298 | 7/2007 |
| JP | 2010-121692 | 6/2010 |
| JP | 2010-180272 A | 8/2010 |
| JP | 2011-220465 | 11/2011 |
| TW | 200835852 A | 9/2008 |

OTHER PUBLICATIONS

Than Trong Long, et al., "Application of Resin Material Bearing to Energy Equipment", Materia Japan, vol. 42, No. 1, 2003, pp. 45-51.
Combined Search and Examination Report issued Apr. 29, 2014, in United Kingdom Patent Application No. GB 1319106.9.
Combined Taiwanese Office Action and Search Report issued Aug. 5, 2015 in Patent Application No. 102139295 (with English Translation).

* cited by examiner

MARINE CURRENT POWER GENERATION DEVICE

CROSS-REFERENCE TO RELATED APPLICATION

This application is based upon Japanese Patent Application No. 2012-206648, filed on Sep. 20, 2012; the entire contents of which are incorporated herein by reference.

FIELD

Embodiments described herein relate generally to a marine current power generation device.

BACKGROUND

Marine current power generation is expected to provide a relatively uniform and predictable output, compared with other power generations such as wind power generation and solar power generation that tend to provide a fluctuating output. Thus, the marine current power generation devices are developing. For example, a bulb-type power generation device is known that has a drive power transmission mechanism and a power generator in a bulb.

This is because the marine current power generation device is placed in the sea or at the bottom of the sea where the speed of the tide is fast, and should be able to supply a stable electricity, its drive power transmission mechanism desirably has a long life and high reliability and is desirably maintenance free.

DETAILED DESCRIPTION

In an embodiment, a marine current power generation device has rotary blades, rotating shaft, power generator, guide bearings, thrust collars and thrust bearings. The rotary blades are rotated by a marine current. The rotating shaft transmits a drive power of the rotary blades. The rotating shaft has a lateral surface being a first slide surface. The power generator generates electricity by the drive power received from the rotating shaft. The guide bearing bears a radial load acting in a radial direction of the rotating shaft. The guide bearing has a second slide surface being slidable relative to the first slide surface of the rotating shaft. The thrust collar is mounted on the rotating shaft and has a rotary plate having a main surface being a third slide surface. The thrust bearing bears a thrust load acting in an axial direction of the rotating shaft. The thrust bearing has a fourth slide surface being slidable relative to the third slide surface of the rotary plate. The materials of the first and third slide surfaces include ferrous materials, stainless materials, Ti, Ti alloy, Co, or Co alloy. The materials of the second and fourth slide surfaces include a resin material filled with a first fibrous member and a second fibrous member. The second fibrous member is smaller than the first fibrous member in size.

Now, the embodiments will be described in detail with reference to the drawings.

First Embodiment

Figure 1:
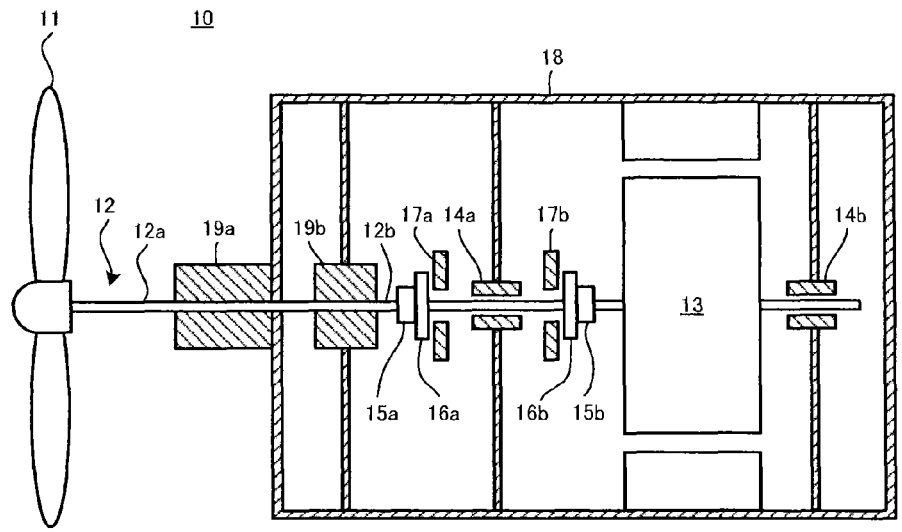
FIG. 1 is a schematic view showing a structure of a marine current power generation device according to a first embodiment.
Figure 2:
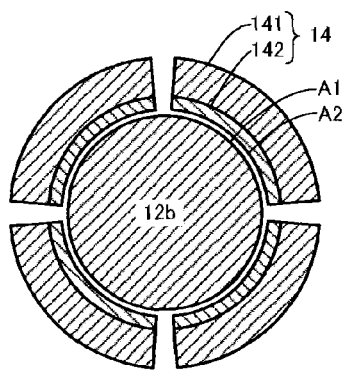
FIG. 2 is a cross-sectional view of a rotating shaft and guide bearing according to the first embodiment.
Figure 3:
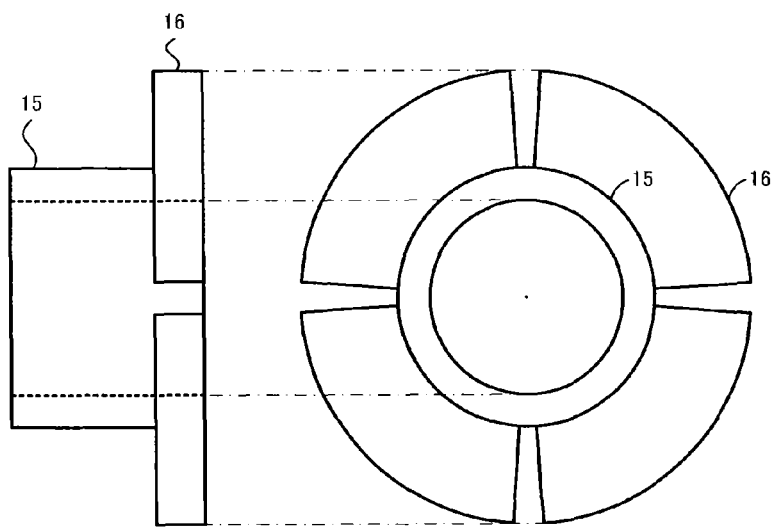
FIG. 3 shows a lateral view of a thrust collar and rotary plate, and a front view the thrust collar and rotary plate according to the first embodiment.
Figure 4:
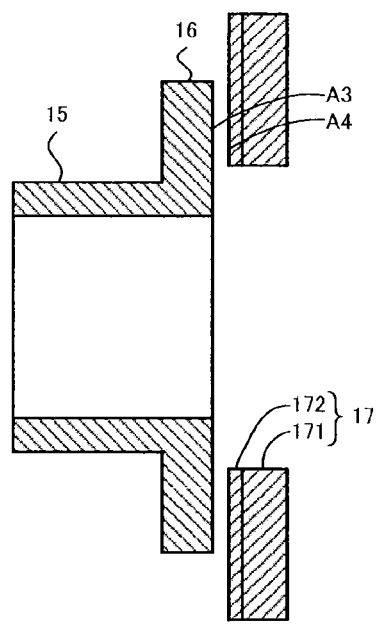
FIG. 4 shows a cross-sectional view of the thrust collar and rotary plate according to the first embodiment.

FIG. 1 is a schematic view showing a structure of a marine current power generation device 10 according to a first embodiment. FIG. 2 is a cross-sectional view of a rotating shaft 12 and guide bearing 14. FIG. 3 shows a side view of a thrust collar 15 and rotary plate 16 as well as a front view of the thrust collar and rotatory plate. FIG. 4 shows a cross-sectional view of the thrust collar 15 and rotary plate 16.

The marine current power generation device 10 is placed in the sea, including at the bottom of the sea, and generates electricity using a marine current. As depicted in FIG. 1, the marine current power generation device 10 includes rotary blades 11, rotating shaft 12, power generator 13, guide bearings 14 (14a, 14b), thrust collars 15 (15a, 15b), rotary plates 16 (16a, 16b), thrust bearings 17 (17a, 17b), bulb 18 and seals 19 (19a, 19b).

The rotary blades 11 are rotated by the marine current.

The rotating shaft 12 is a generally cylindrical member that couples the rotary blades 11 to the power generator 13 and transmits a drive power of the rotary blades 11 to the power generator 13. The rotating shaft 12 has a slide surface A1 that slides relative to the guide bearing 14. The slide surface A1 is that part of a lateral face of the rotating shaft 12 which corresponds to the guide bearing 14.

The rotating shaft 12 has an outer shaft 12a, which extends outside the bulb 18, and an inner shaft 12b, which extends inside the bulb 18. The outer shaft 12a and inner shaft 12b may be connected to each other by a coupling device. Alternatively, the outer and inner shafts 12a and 12b may be integrally manufactured as a single shaft. The outer shaft 12a may be made from a stainless steel which has a corrosion resistance. The inner shaft 12b and the rotary plates 16 (will be described) may be made from a carbon steel if cost is taken into consideration.

The power generator 13 generates electricity with the drive force received from the rotating shat 12.

The guide bearings 14 are fitted on the inner shaft 12b and bear a radial load acting in a radial direction of the rotating shaft 12b. As shown in FIG. 2, each guide bearing 14 has a base part 141 and a slide part (bearing pad) 142. The base part 141 may be made from a ferrous material (e.g., carbon steel). The slide part 142 may be a resin component that is filled up with a first and second fibrous members having different sizes. The detail thereof will be described later. The slide part 142 has a slide surface A2 that slides relative to the inner shaft 12b.

As shown in FIGS. 1 and 3, the thrust collars 15 are cylindrical members mounted on the inner shaft 12b. The inner shaft 12b extends through the thrust collars 15, and is fixed to the thrust collars 15. Each of the thrust collars 15 has a rotary plate 16 at one end thereof.

The rotary plates 16 are attached to the end faces of the associated thrust collars 15. The rotary plates 16 are in contact with the associated thrust bearings 17 and slide relative to the associated thrust bearings 17. The rotary plate 16 has a circular or disc shape as a whole, and usually includes a plurality of fan-shaped segments. In this embodiment the rotary plate 16 is divided into four segments, but the number of segments may be changed under given circumstances. Each rotary plate 16 is made from, for example, a ferrous material (e.g., carbon steel), and has a slide surface A3 that slides relative to the associated guide bearing 14. The slide surface A3 is part of a main surface of the rotary plate 16.

Each of the thrust bearings 17 contacts and slides relative to the associated rotary plate 16 to bear a thrust load acting in an axial direction of the inner shaft 12b. As illustrated in FIG. 4, the thrust bearing 17 can be divided into a base part 171 and a slide part (bearing pad) 172. Similar to the base part 141, the base part 171 may be made from a ferrous material (e.g., carbon steel). Similar to the slide part 142, the slide part 172 may have a resin component that is filled up with first and second fibrous members having different sizes. The slide part 172 has a slide surface A4 that slides relative to the rotary plate 16.

The bulb 18 is a kind of container (i.e., casing), and houses the power generator 13, thrust collars 15 (15a, 15b), rotary plates 16 (16a, 16b), and thrust bearings 17 (17a, 17b). The inside of the bulb 18 is filled with a gas (e.g., air or inert gas). The power generator 13, thrust collars 15 (15a, 15b), rotary plates 16 (16a, 16b) and thrust bearings 17 (17a, 17b) are prevented from contacting the seawater. As such, the power generator 13 and other components including control units are protected, and corrosion protection is ensured against the seawater.

The seals 19 provide airtight sealing between the rotating shaft 12 and bulb 18, with the rotating shaft 12 being able to rotate, to prevent the seawater from entering the bulb 18 from the rotating shaft 12.

The slide surface A1 of the inner shaft 12b and the slide surfaces A3 of the rotary plates 16, which contact the guide bearings 14 and thrust bearings 17, are made from a ferrous material. In this embodiment, because the guide bearings 14 (14a, 14b) and the thrust bearings 17 (17a, 17b) are situated inside the bulb 18, the slide surface A1 of the inner shaft 12b and the slide surface A3 of the rotary plates 16 are prevented from direct contact with the seawater and protected from corrosion. Accordingly, it is possible to use a ferrous material (e.g., carbon steel) for the slide surfaces A1 and A3, and this contributes to cost reduction.

As described above, the slide parts 142 and 172 (slide surfaces A2 and A4) of the guide bearing 14 and thrust bearing 17 include the resin components that are filled up with the first and second fibrous members having different sizes. The first fibrous member is longer than the second fibrous member.

As mentioned earlier, the slide surface A1 of the inner shaft 12b and the slide surfaces A3 of the rotary plates 16 are made from the ferrous material such as carbon steel. In contrast, the slide parts 142 (slide surfaces A2) of the guide bearings 14 and the slide parts 172 (slide surfaces A4) of the thrust bearings 17 are made from the resin material, which has a low friction coefficient, high wear resistance, high seizure resistance and small aggression to the associated slide member. Thus, the bearings and those components which are in slide-contact with the bearings, such as the rotating shaft and rotary plates, can slide smoothly such that the bearings and these components are not damaged due to wear and seizure. This can extend the maintenance period and life of the marine current power generation device 10.

It should be noted that polytetrafluoroethylene may be used as the resin material of the slide parts 142 and 172 in order to ensure a low friction coefficient and high seizure resistance, but polytetrafluoroethylene alone cannot provide a sufficient wear resistance. As such, the wear resistance may be improved by filling the polytetrafluoroethylene with ceramics fiber that is hard and has an excellent wear resistance. The ceramics fiber may include continuous fiber (long fiber) with a diameter between several micrometers and several tens micrometers, such as glass fiber, alumina fiber, silica-alumina fiber, zirconia fiber, and carbon fiber, or and short fiber with an aspect ratio between several tens and several hundreds.

If a polytetrafluoroethylene component is filled with the ceramics fiber, however, polytetrafluoroethylene will have an increased friction coefficient and a significantly strong aggression to the associated slide component. For example, if a polytetrafluoroethylene component is filled with glass fiber 20 weight %, then the associated slide component which is made from carbon steel is worn several thousand times, as compared with a polytetrafluoroethylene component that is not filled with glass fiber (this comparison is made in the water).

If it is filled with ceramics fiber having a relatively large diameter, i.e., diameter between several micrometers and several tens micrometers, the fiber is exposed from the slide surface as the wear progresses, and then the fiber is released from the slide surface to move in the slide direction. As a result, the ceramics fibers slide to form scratches on the polytetrafluoroethylene component and the associated slide component of carbon steel. This increases an amount of wear, and also increases the possibility of seizure. This is because polytetrafluoroethylene itself in the ceramics fiber is soft, does not have a sufficient strength and is easy to scratch.

If a filling amount of ceramics fiber is increased, the interfiber distance becomes smaller and it is possible to reduce long slide-scratches. This enhances the wear resistance. On the other hand, the friction coefficient rises. In addition, this prevents polytetrafluoroethylene from surrounding the ceramics fiber so as not to hold sufficiently. This results in easy releasing of the ceramics fiber. Because of these reasons, the filling amount of ceramics fiber should be limited.

In contrast, a fine ceramics whisker with a diameter between 0.05 and 1 micrometer and an aspect ratio of 100 or less can ensure a sufficiently small interwhisker distance even if its amount of addition is small. Also, this does not create deep slide-scratches due to the slide and falling of the whisker. In order to ensure a wear resistance, however, several tens weight % of ceramics whisker should be included.

Because the whisker is a fine fiber, it is easy to condense or aggregate. If a large amount of whisker is added, the whisker does not spread sufficiently and creates an aggregation of whisker. As a result, those aggregations of whisker which do not have a holding force would be released, and a merit of the added whisker cannot be obtained. This would result in a significant drop in the wear resistance.

In view of the above-described phenomena, the carbon fiber and the ceramics whisker (at least one selected from a group consisting of potassium titanate, aluminum borate, zinc oxide and silicon carbide) are added to a base material made from polytetrafluoroethylene having a low friction coefficient. The carbon fiber possesses the wear resistance, performs self-lubrication and is not aggressive to a component that slides relative to the carbon fiber. Soft polytetrafluoroethylene that is situated between the carbon fiber and does not have a sufficient strength is reinforced with the ceramics whisker. By optimizing the diameters, aspect ratios, amounts of filling and ratios of filling of the fiber and whisker, a certain range of composition was found that provides a high friction coefficient, high wear resistance, high seizure resistance and low aggressiveness to a component that slides relative to the polytetrafluoroethylene material.

Carbon and ceramics can be used as the first and second fibrous members, and polytetrafluoroethylene can be used as the resin material. In other words, carbon and ceramics that have better wear resistance than a resin material (e.g., polytetrafluoroethylene) can be used for the first and second fibrous members.

The ceramics whisker may contain one selected from a group consisting of potassium titanate, aluminum borate, zinc oxide and silicon carbide.

As described above, the size of the first fibrous member is different from the size of the second fibrous member so that the wear resistance of the resin material filled with the first and second fibrous members is increased. In general, the size of the carbon fiber is greater than the size of the ceramics whisker, and therefore a combination of the carbon fiber and ceramics whisker can be used as the first and second fibrous members.

The sizes and aspect ratio (ratio of diameter to length) of the carbon fiber and ceramics whisker should not be limited, but preferably the carbon fiber has a diameter between 1 and 50 micrometers and an aspect ratio between 5 and 100, and the ceramics whisker has a diameter between 0.05 and 1 micrometer and an aspect ratio between 5 and 100 if improvements on the material properties and manufacturing cost are taken into account.

Preferably the content percentage of a filler (first and second fibrous members made from carbon fiber and ceramics whisker) is between 5 and 50 mass %. The content percentage is a ratio of a total weight of the carbon fiber and ceramics whisker to a total weight of the resin material, carbon fiber and ceramics whisker. If the content percentage is less than 5 mass %, the resulting improvements are small. If the content percentage is greater than 50 mass %, the resulting improvements do not increase significantly and the manufacturing becomes difficult.

The volume ratio of the carbon fiber to the ceramics whisker is preferably between 2:1 and 10:1. This range of volume ratio promises a good balance between the friction coefficient and the wear resistance. If the volume ratio is outside this range, the resulting improvements are small and the manufacturing becomes difficult.

Second Embodiment

Figure 5:
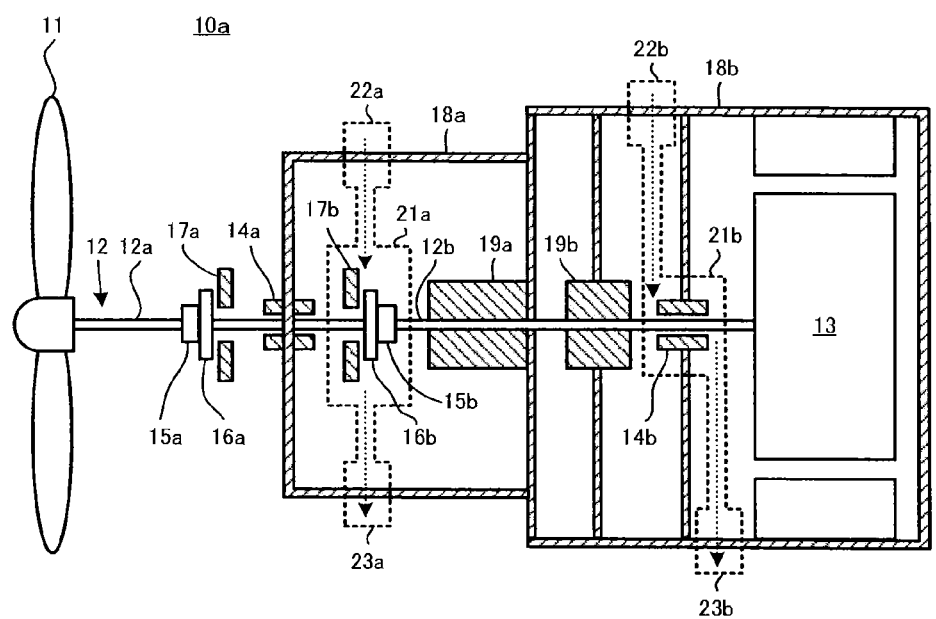
FIG. 5 is a schematic view showing a structure of a marine current power generation device according to a second embodiment.
Figure 6:
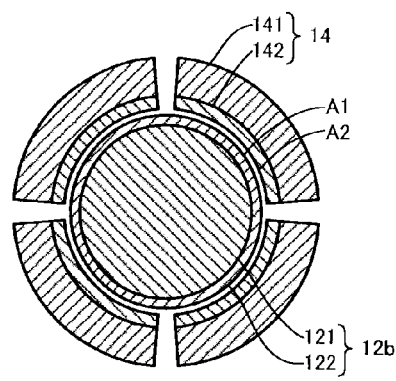
FIG. 6 is a cross-sectional view of a rotating shaft and guide bearing according to the second embodiment.
Figure 7:
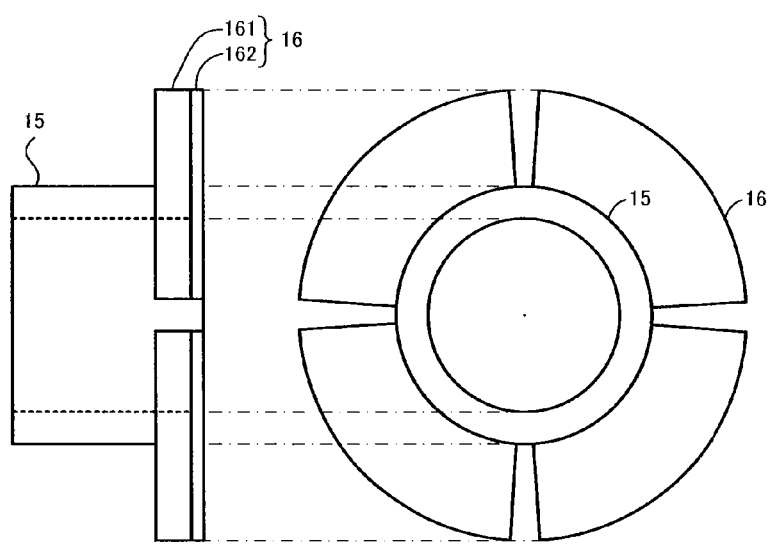
FIG. 7 illustrates a lateral view of a thrust collar and rotary plate, and a front view the thrust collar and rotary plate according to the second embodiment.
Figure 8:
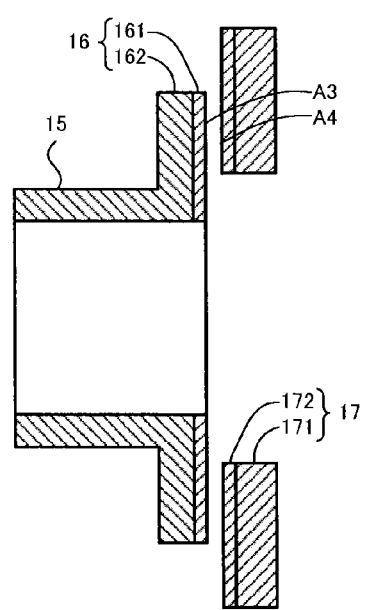
FIG. 8 illustrates a cross-sectional view of the thrust collar and rotary plate according to the second embodiment.

FIG. 5 schematically illustrates a structure of the marine current power generation device 10a according to a second embodiment. FIG. 6 is a cross-sectional view of a rotating shaft 12 and guide bearings 14. FIG. 7 shows a side view of thrust collars 15 and rotary plates 16 as well as a front view of the thrust collars and rotary plates. FIG. 8 is a cross-sectional view of the thrust collar 15 and rotary plate 16.

The ocean current power generation device 10a includes rotary blades 11, rotating shaft 12 (12a, 12b), power generator 13, guide bearings 14 (14a, 14b), thrust collars 15 (15a, 15b), rotary plates 16 (16a, 16b), thrust bearings 17 (17a, 17b), bulbs 18a and 18b, and seals 19 (19a, 19b). It should be noted here that members indicated by the broken line, such as covers 21a and 21b, are hypothetical and do not exist.

In this embodiment, the bulb 18a is not sealed by the seal 19, and the seawater flows in. On the other hand, the bulb 18b is shielded from the seawater by the seal 19 and is sealed airtight.

The guide bearing 14a, thrust collar 15a, rotary plate 16a and thrust bearing 17a are provided outside the bulbs 18a and 18b and contact the seawater. In other words, the rotary plate 16a and thrust bearing 17a rotate using the seawater as lubricant (seawater lubrication).

The thrust collar 15b, rotary plate 16b and thrust bearing 17b are provided in the bulb 18a, and contact the seawater. In other words, the rotary plate 16b and thrust bearing 17b also rotate using the seawater as lubricant (seawater lubrication).

The guide bearing 14b is located in the bulb 18b and does not contact the seawater.

Referring now to FIG. 6, those portions of the rotating shaft 12b which correspond to the guide bearing 14a are referred to as a base portion 121 and slide portion 122. The slide portion 122 (slide surface A1) of the rotating shaft 12b, which contacts the seawater, may be made from an anti-corrosion metal. Specifically, the slide portion 122 is made from an anti-corrosion metal (e.g., stainless material, Ti, Ti alloy, Co or Co alloy). Use of such material can extend the life of the slide part 122 of the rotating shaft 12b that contacts the seawater. The base portion 121 may be made from a metallic material (e.g., carbon steel).

Likewise, the rotary plate 16 (16a, 16b) is divided into a base portion 161 and slide portion 162, as shown in FIGS. 7 and 8. The slide portion 162 (slide surface A3) of the rotary plate 16, which contacts the seawater, may be made from an anti-corrosion metal. Specifically, the slide portion 162 is made from an anti-corrosion metal (e.g., stainless material, Ti, Ti alloy, Co or Co alloy). Use of such material can extend the life of the slide part 162 of the rotary plate 16 that is subjected to the seawater.

It should be noted that the rotating shaft 12 and rotary plates 16 may entirely be made from an anti-corrosion metal (e.g., stainless material, Ti, Ti alloy, Co or Co alloy).

Also, the base portion 141 of the guide bearing 14a and the base portions 171 of the thrust bearings 17a and 17b may be made from an anti-corrosion metal (e.g., stainless material, Ti, Ti alloy, Co, or Co alloy) to extend the longevity.

In contrast, those portions of the rotating shaft 12b which correspond to the guide bearing 14bF are not subjected to the seawater. Thus, it is not particularly necessary to provide a slide portion 122 that would be made from an anti-corrosion metal. In other words, the slide surface A1 of that portion of the rotating shaft 12b which corresponds to the guide bearing 14b may be made from a ferrous material (e.g., carbon steel).

Modification

A modification to the second embodiment will be described. As indicated by the broken line in FIG. 5, it is possible to supply the lubrication seawater to the slide surface A4 of the thrust bearing 17b and the slide surface A2 of the guide bearing 14b. In other words, the thrust bearing 17b and the guide bearing 14b are covered with the covers 21a and 21b respectively, and the seawater is supplied and discharged through the water feed units 22a and 22b and the water discharge units 23a and 23b. In this instance, that portion of the rotating shaft 12 which corresponds to the guide bearing 14b is also subjected to the seawater, and therefore it is preferred to provide the slide portion 122 that is made from an anti-corrosion metal.

In this manner, at least the slide surface A1 of the rotating shaft 12b that slides relative to the guide bearing 14 and at least the slide surface A3 of the rotary plate 16 that slides relative to the thrust bearing 17 can be made from an anti-corrosion metal. As a result, the corrosion resistance in the seawater is improved and smooth sliding condition is maintained. This realizes maintenance-free and stable electricity feeding for a long period.

The slide portion 162 may be provided by forming a layer of anti-corrosion metal on the base portion 161. For example, the slide portion 162 may be provided by means of mechanical coupling (e.g., engagement or screwing), thermal spraying or overlaying.

In the ocean current power generation device of the above-described embodiments, the slide portions 142 and 172 (slide surfaces A2 and A4) of the guide bearings 14 and thrust bearings 17 include the resin components that are filled with the first and second fibrous members, and the size of the first fibrous member is different from that of the second fibrous member. Also the slide surfaces of the rotating shaft 12b and rotary plates 16 are made from an appropriate anti-corrosion metal. Consequently, the rotating shaft 12 can smoothly slide relative to the guide bearings 14 and thrust bearings 17 for a long period without maintenance. In other words, damages to the bearings will be reduced so that the power generation efficiency improves and the running cost (operation cost) decreases.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A marine current power generation device, comprising:
   rotary blades configured to be rotated by a marine current;
   a rotating shaft configured to transmit a drive power of the rotary blades, the rotating shaft having a lateral surface being a first slide surface;
   a power generator configured to generate electricity by the drive power received from the rotating shaft;
   a guide bearing configured to bear a radial load acting in a radial direction of the rotating shaft, the guide bearing having a second slide surface being slidable relative to the first slide surface;
   a thrust collar mounted on the rotating shaft and having a rotary plate having a main surface being a third slide surface; and
   a thrust bearing configured to bear a thrust load acting in an axial direction of the rotating shaft, the thrust bearing having a fourth slide surface being slidable relative to the third slide surface,
   materials of the first and third slide surfaces including ferrous materials, stainless materials, Ti, Ti alloy, Co, or Co alloy, and
   materials of the second and fourth slide surfaces including a resin material filled with a first fibrous member and a second fibrous member, the second fibrous member being smaller than the first fibrous member in size.

2. The marine current power generation device according to claim 1,
   wherein the first fibrous member has a diameter between 1 micrometer and 50 micrometers and an aspect ratio between 5 and 100, and the second fibrous member has a diameter between 0.05 micrometer and 1 micrometer and an aspect ratio between 5 and 100.

3. The marine current power generation device according to claim 1,
   wherein the first fibrous member includes a carbon fiber, the second fibrous member includes a ceramics whisker, and the resin material includes polytetrafluoroethylene.

4. The marine current power generation device according to claim 3,
   wherein the ceramics whisker contains at least one selected from a group consisting of potassium titanate, aluminum borate, zinc oxide, and silicon carbide.

5. The marine current power generation device according to claim 1,
   wherein a percentage of a total weight of the first and second fibrous members to a total weight of the resin material, the first and second fibrous members is between 5 mass % and 50 mass %.

6. The marine current power generation device according to claim 1,
   wherein a volumetric ratio of the first fibrous member to the second fibrous member is between 2 to 1 and 10 to 1.

7. The marine current power generation device according to claim 1 further comprising
   a bulb configured to seal part of the rotating shaft, the guide bearing, and the thrust bearing to prevent contact to seawater.

8. The marine current power generation device according to claim 7 further comprising
   a water supply unit configured to supply seawater to the guide bearing and the thrust bearing.

9. The marine current power generation device according to claim 8,
   wherein the rotating shaft includes a first base portion and a first slide portion, the first base portion being made from a ferrous material and having a cylindrical shape, and the first slide portion covering a lateral face of the first base portion, having the first slide surface and made from stainless material, Ti, Ti alloy, Co, or Co alloy, and
   the rotary plate includes a second base portion and a second slide portion, the second base portion being made from a ferrous material and having a disc shape, and the second slide portion covering a main face of the second base portion, having said third slide surface and made from stainless material, Ti, Ti alloy, Co, or Co alloy.

10. The marine current power generation device according to claim 9,
    wherein the guide bearing includes a third base portion and a third slide portion, the third base portion being made from a ferrous material, stainless material, Ti, Ti alloy, Co, or Co alloy, and the third slide portion having the second slide surface; and
    wherein the thrust bearing includes a fourth base portion and a fourth slide portion, the fourth base portion being made from a ferrous material, stainless material, Ti, Ti alloy, Co, or Co alloy, and the fourth slide portion having the fourth slide surface.

* * * * *